(12) United States Patent
Daggett

(10) Patent No.: US 6,644,033 B2
(45) Date of Patent: Nov. 11, 2003

(54) TIP IMPINGEMENT TURBINE AIR STARTER FOR TURBINE ENGINE

(75) Inventor: David L. Daggett, Snohomish, WA (US)

(73) Assignee: The Boeing Company, Chicago, IL (US)

(*) Notice: Subject to any disclaimer, the term of this patent is extended or adjusted under 35 U.S.C. 154(b) by 21 days.

(21) Appl. No.: 10/052,180

(22) Filed: Jan. 17, 2002

(65) Prior Publication Data

US 2003/0131607 A1 Jul. 17, 2003

(51) Int. Cl.⁷ .............................................. F02C 7/277
(52) U.S. Cl. ...................................................... 60/787
(58) Field of Search ........................... 60/728, 787, 789

(56) References Cited

U.S. PATENT DOCUMENTS

| | | |
|---|---|---|
| 2,457,833 A | 1/1949 | Redding |
| 2,597,641 A | 5/1952 | Hull et al. |
| 2,640,315 A | 6/1953 | Secord |
| 2,651,493 A * | 9/1953 | Volk ............................ 60/787 |
| 2,937,491 A * | 5/1960 | Howell ........................ 60/787 |
| 2,959,919 A * | 11/1960 | Chiera et al. .................. 60/787 |
| 2,971,333 A * | 2/1961 | Mendelsohn et al. ......... 60/787 |
| 3,009,320 A * | 11/1961 | Paiement ...................... 60/787 |
| 3,085,396 A * | 4/1963 | Kent et al. .................... 60/787 |
| 3,323,775 A * | 6/1967 | Snell ............................ 60/787 |
| 3,451,215 A * | 6/1969 | Barr ............................. 60/787 |
| 4,161,102 A * | 7/1979 | Jasas et al. ................... 60/787 |
| 4,712,371 A | 12/1987 | Weber |
| 5,054,283 A | 10/1991 | Jones |
| 5,115,637 A | 5/1992 | Shekleton |
| 5,343,690 A | 9/1994 | Shekleton et al. |

* cited by examiner

Primary Examiner—Michael Koczo
(74) Attorney, Agent, or Firm—Ann Galbraith

(57) ABSTRACT

A gas turbine jet engine having a channel in a turbine casing through which a quantity of compressed air from a pressurized air source is introduced to start the gas turbine jet engine. The compressed air is expanded and accelerated by a series of diffusers and then impinges upon at least one impulse-type turbine bucket member located on the tip of a turbine blade to drive the turbine, which drives a compressor to start engine. Alternatively, the channel in the casing is located close to an axial compressor in a gas turbine engine's forward section and drives at least one turbine bucket member on a shrouded integrated compressor/turbine blade to drive the compressor to start the gas jet turbine engine.

8 Claims, 2 Drawing Sheets

TIP IMPINGEMENT TURBINE AIR STARTER FOR TURBINE ENGINE

TECHNICAL FIELD

The present invention generally relates to a method for starting turbine engines and more specifically to a tip impingement air starter for a turbine engine.

BACKGROUND ART

This invention relates to power plants and particularly to a gas turbine power plant that may be used for effecting propulsion of aircraft at high speeds. Such a power plant may include an air compressor, a combustion apparatus, and a gas turbine compactly arranged in series to keep the weight, overall length and diameter of the unit to a minimum. These parts may be built into the wing of an aircraft or mounted centrally within and supported by an outer casing of streamline form that directs the flow of air through the power plant.

The turbine is driven by the hot gases provided by the compressor and combustion apparatus and extracts at least sufficient power from these gases to drive the compressor. The remainder of the available power may be utilized to propel the aircraft by ejecting the gases from a propulsion jet rearwardly of the turbine.

Since the power plant relies on the power supplied to the turbine to operate the air compressor, it is not self-starting and some means must be provided for initially rotating the turbo compressor shaft. Starting gas turbine engines in an efficient manner has been a challenge virtually from the beginning of the use of turbine engines. The starters are used relatively infrequently, are required to convert large amounts of power, and must be carried along with the powerplant as dead weight.

Lightweight impingement air starters have been used in the past, but unfortunately were not efficient in their use of the supplied compressed air. Present day air starters are efficient but at the expense of weight, gearing complexity and cost. Present day air starters are also subject to mechanical breakdown.

It is thus highly desirable to provide an improved system and method for starting turbine engines. If is also desirable to simplify the design of impingement air starters for turbine engines and reduce weight, complexity and cost.

SUMMARY OF THE INVENTION

The present invention involves introducing a channel into the turbine case by which compressed air can be introduced from a pressurized air source to turn the High Pressure (HP) turbine, thereby turning the HP compressor, and enabling the gas turbine engine to be started. High pressure air is introduced through a channel in the turbine casing and expanded/accelerated by a series of diffusers. This high velocity air impinges upon at least one turbine bucket member that is located on the tip of a HP turbine blade. These turbine bucket members are preferably impulse-type turbine bucket members. After kinetic energy from the high velocity air is extracted by the turbine bucket members, the gas can be directed through a series of openings located upstream of the turbine blade and is directed to the airfoil section of the turbine blade to extract any remaining kinetic energy.

In an alternative embodiment, the channel in the casing is located close to an axial compressor in a gas turbine engine's forward section. In this embodiment, one stage of an axial compressor in a gas turbine engine's forward section is modified to incorporate a small turbine bucket member at the top of each compressor blade. Air is then introduced to the small turbine bucket member in a manner similar to that described above to start the engine. In addition, the configuration of this stage can be used to help recover gas energy.

BEST MODES FOR CARRYING OUT THE INVENTION

Figure 1:
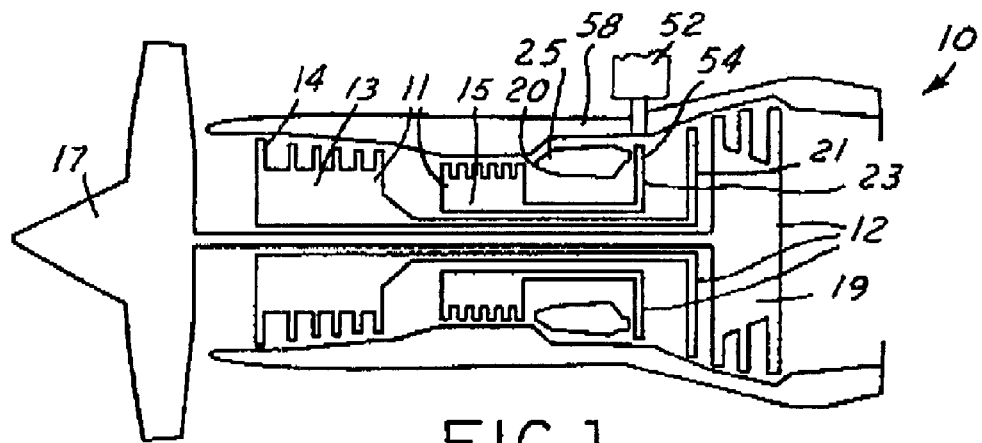
FIG. 1 depicts a high pressure jet turbine engine according to a preferred embodiment of the present invention.

In the following figures, the same reference numerals will be used to identify identical components in the various views. The present invention is illustrated with respect to a high-pressure gas jet turbine engine, particularly suited for the aerospace industry. Although the present invention is depicted and discussed for the preferred use, it is clear that the invention is not to be limited to such uses and can be utilized for any turbine engine regardless of application or use.

Known turbine jet engines use compressed air to drive an air starter which then mechanically drives the compressor/turbine shaft to start a turbine jet engine. These air starters are complex and relatively heavy. The starters are typically coupled to the turbine casing gear box of the engine during operation. As such, they represent dead weight on an aircraft or similar structure when not being used. The present invention eliminates the need for these types of complex air starters.

Figure 2:
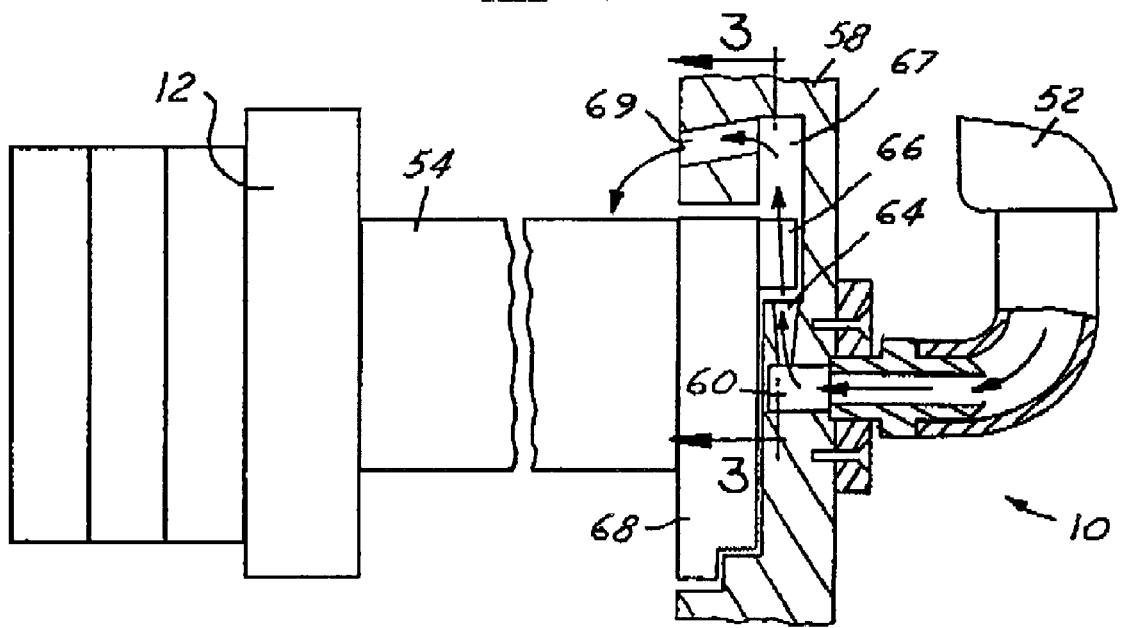
FIG. 2 is a close-up view of a portion of a gas jet turbine engine of FIG. 1.
Figure 3:
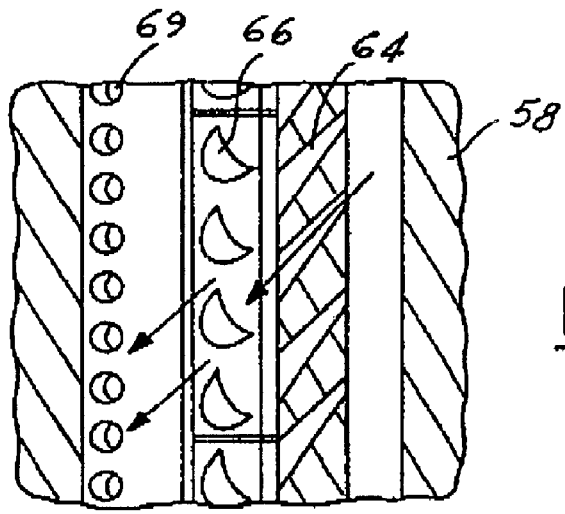
FIG. 3 is a section view of FIG. 2 taken along line 3—3.

Referring now to FIGS. 1, 2 and 3, a high-pressure gas jet turbine engine 10 according to one preferred embodiment is shown as having a multistage axial compressor 11, a multistage turbine 12, a combuster 25 having a nozzle 20, and a fan 17. The multistage axial compressor 11 consists of a low pressure compressor 13 and a high pressure compressor 15. The multi-stage turbine 12 has a low pressure turbine 19, an intermediate pressure turbine 21, and a high pressure turbine 23. As best shown in FIG. 1, the high pressure turbine 23 is coupled to the high pressure compressor 15, the intermediate pressure turbine 17 coupled to the low pressure compressor 13, and the low pressure turbine coupled to a fan 19. The multi-stage axial compressor 11 comprises alternating sets of rotating blades 14 and stationary blades that draw in air and compresses it. Fuel is injected into the combustion chamber 25 from the fuel nozzle 20 and combustion is effected. The rise in temperature produces a considerable increase in the volume of the gases, which are expelled through the exhaust nozzle (not shown) in the rear. The turbine 12 absorbs a portion of the energy from the gases necessary to drive the compressor 11, the greater portion is utilized to develop propulsive thrust.

FIGS. 2 and 3 depict close-up views of the gas turbine engine 10 of FIG. 1. As best seen in FIG. 2, a high pressure turbine 12 has a turbine blade 54 and a turbine casing 58 that directs the hot combustion gas introduced from compressor 11 and from the combustion chamber 25. The casing 58 also has a channel 60 by which compressed air can be introduced from a pressurized air source 52 to turn the high pressure turbine 23, thereby turning the HP compressor 15 (shown as 15 in FIG. 1) of the axial compressor 11, and enabling the engine 10 to be started. The source of pressurized air constituting the pressurized air source 52 preferably is a ground start cart or another closely coupled turbine engine, or combinations of both. However, a person of ordinary skill in the art would appreciate that other potential sources of pressurized air are possible.

After the compressed air (shown by arrows) is introduced to the channel 60, as best shown in FIG. 3, the air is expanded by a series of diffusers 64 located in the turbine casing 58. This high velocity air then impinges upon a series of turbine bucket members 66 that are located at the tip 68, or shroud, of the turbine blade 54. These turbine bucket members 66 are preferably impulse-type turbine bucket members 66. After the kinetic energy from the high velocity air is extracted, the gas is then directed through a series of openings 69 in the casing 58 located upstream of the turbine blade 54 and is directed to the airfoil section of the turbine blade 54 to extract any remaining kinetic energy.

The gas turbine engine 10 as shown in FIGS. 2 and 3 offer improvements over known systems. The new system reduces weight by eliminating the conventional starter system and associated case impingement cooling system. Because the turbine blades 54 are preferably shrouded to reduce tip leakage, the addition of a plurality of small turbine bucket members 66 only slightly increases the weight. Pressurizing the cavity 67 will reduce tip 68 leakage to almost zero and will also help to cool the turbine blades 54 and casing 58. The present invention also improves reliability by eliminating moving parts from the starting mechanisms.

Figure 4:
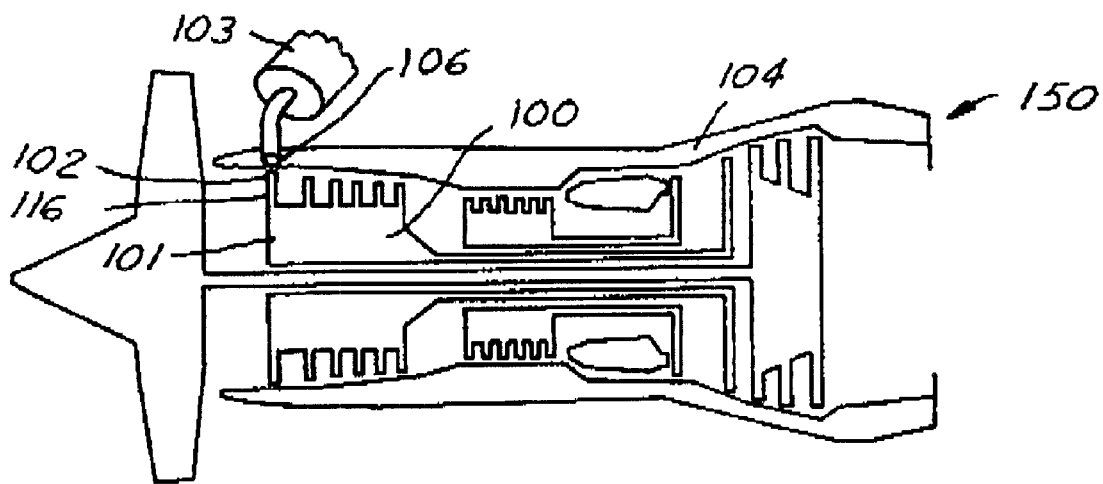
FIG. 4 is a close-up view of another portion of a gas jet turbine engine according to another preferred embodiment of the present invention.
Figure 5:
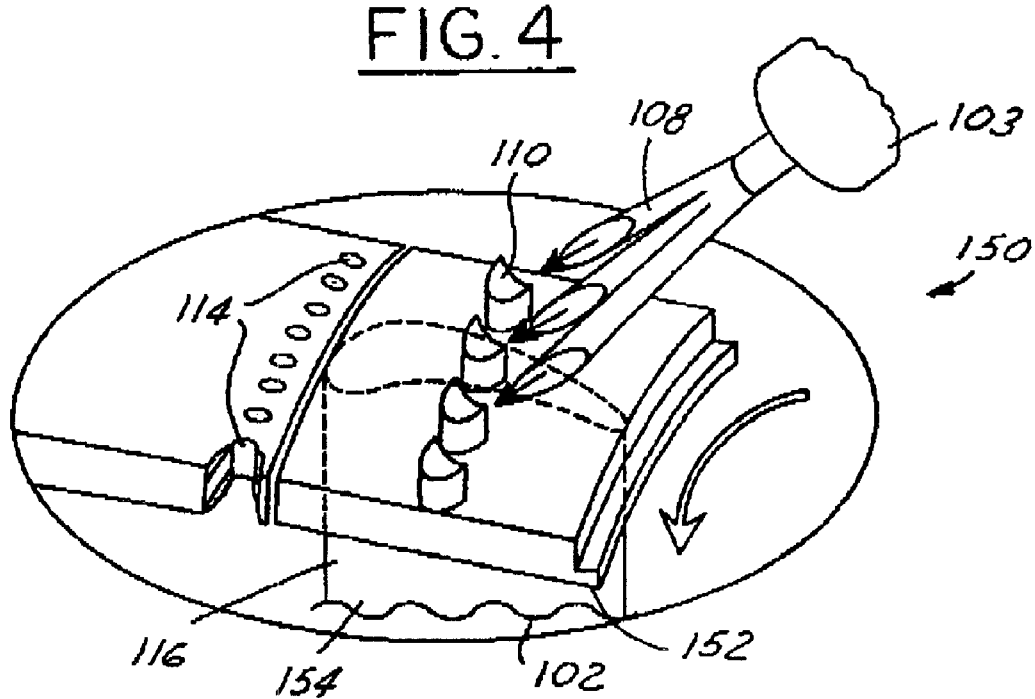
FIG. 5 is a close-up view of a portion of FIG. 4.

FIGS. 4 and 5 depict a high-pressure gas jet turbine engine 150 according to another preferred embodiment of the present invention. In this embodiment, one stage of an axial compressor 100 in a gas turbine engine's forward section is modified to incorporate a small turbine and turbine bucket at the top of each compressor blade. This stage can be used to help recover gas energy and can be used as a starter for the turbine engine 150.

As best seen in FIG. 4, the front axial section 101 of the engine compressor 100 has an integrated compressor/turbine blade 102 and a casing 104. Each integrated compressor/turbine blade 102 comprises an airfoil 116, a shroud 152, and a turbine or turbines, preferably impulse type turbines 110. The casing 104 has a channel 106 by which compressed air can be introduced from a pressurized air source 103 to turn the compressor/turbine blade 102, thereby turning the compressor 100, and enabling the engine 150 to be started. As above, the source of pressurized air constituting the pressurized air source 103 preferably is a ground start cart or bleed air from another closely coupled turbine engine, or combinations of both.

After the compressed air (shown by arrows) is introduced to the channel 106 from the pressurized air source 108, as best shown in FIG. 5, the pressurized air is expanded by a series of diffusers 108. This high velocity air then impinges upon at least one turbine bucket member 110 that is located at the tip 152 of the integrated compressor/turbine blade 102, thereby driving the blade 102 and the compressor 100 to start the turbine engine 150. These turbine bucket members 110 are preferably impulse-type turbine bucket members 110. After the kinetic energy from the high velocity air is extracted, the gas is preferably then directed through a series of openings 114 located upstream of the blade 102 and is then directed to the airfoil 116 of the integrated compressor/turbine blade 102 to extract any remaining kinetic energy.

The gas jet turbine engine 150 as shown in FIGS. 4 and 5 replaces the air starters of the prior art and offer improvements in terms of reliability while reducing cost and weight.

While the invention has been described in terms of preferred embodiments, it will be understood, of course, that the invention is not limited thereto since modifications may be made by those skilled in the art, particularly in light of the foregoing teachings.

What is claimed is:

1. A method for starting a gas jet turbine engine having a multi-stage axial compressor and a high pressure turbine comprising:

providing a channel within a turbine casing;

coupling at least one turbine bucket member to a tip of at least one of a plurality of turbine blades of the high pressure turbine;

providing a quantity of compressed air through said channel of said turbine casing;

expanding said quantity of compressed air within a series of diffusers; and impinging said at least one turbine bucket member with said expanded quantity of compressed air to rotate the high pressure turbine;

directing said expanded quantity of compressed air through a series of openings located upstream of said plurality of turbine blades after impinging said at least one turbine bucket member; and directing said expanded quantity of compressed air to an airfoil section of said plurality of turbine blades to extract any remaining kinetic energy from said expanded quantity of compressed air.

2. The method of claim 1, wherein the step of providing a quantity of compressed air comprises:

providing a quantity of compressed air from a pressurized air source through said turbine casing from a pressurized air source.

3. The method of claim 1, wherein said plurality of turbine blades comprises a plurality of shrouded turbine blades.

4. The method of claim 1, wherein coupling at least one turbine bucket member to a tip of at least one of a plurality of turbine blades of the turbine comprises coupling at least one impulse-type turbine bucket member to a tip of at least one of a plurality of turbine blades of the high pressure turbine.

5. A gas jet turbine engine comprising:

a multi-stage axial compressor;

a turbine casing having a channel;

a pressurized gas source coupled to said turbine casing and enclosing said channel on its outer periphery;

a turbine having a plurality of turbine blades, wherein at least one of said turbine blades is closely coupled with said channel, wherein said at least one of said turbine blades comprises an airfoil and at least one turbine bucket member, wherein said pressurized gas source is used to introduce a quantity of compressed air through said channel to impinge said at least one turbine bucket member to start the gas jet turbine engine;

wherein said turbine casing further comprises a series of openings used to move said quantity of expanded compressed air to said airfoil after engaging said at least one turbine bucket member.

6. The gas jet turbine engine of claim 5, wherein said at least one turbine bucket member comprises at least one impulse-type turbine bucket member.

7. The gas turbine jet engine of claim 6, wherein said plurality of turbine blades comprises a plurality of shrouded turbine blades, wherein each of said plurality of shrouded turbine blades comprises an airfoil and at least one turbine bucket member.

8. The gas turbine jet engine of claim 6, wherein said turbine casing further comprises a series of diffusers used to expand a quantity of compressed air leaving said channel prior to engaging said at least one turbine bucket member.

* * * * *